(12) United States Patent
Liu et al.

(10) Patent No.: US 11,734,174 B2
(45) Date of Patent: Aug. 22, 2023

(54) LOW OVERHEAD, HIGH BANDWIDTH RE-CONFIGURABLE INTERCONNECT APPARATUS AND METHOD

(71) Applicant: Intel Corporation, Santa Clara, CA (US)

(72) Inventors: Huichu Liu, Santa Clara, CA (US); Tanay Karnik, Portland, OR (US); Tejpal Singh, Shrewsbury, MA (US); Yen-Cheng Liu, Portland, OR (US); Lavanya Subramanian, Santa Clara, CA (US); Mahesh Kumashikar, Bangalore (IN); Sri Harsha Choday, Hillsboro, OR (US); Sreenivas Subramoney, Bangalore (IN); Kaushik Vaidyanathan, Santa Clara, CA (US); Daniel H. Morris, Palo Alto, CA (US); Uygar E. Avci, Portland, OR (US); Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 785 days.

(21) Appl. No.: 16/576,687

(22) Filed: Sep. 19, 2019

(65) Prior Publication Data
US 2021/0089448 A1 Mar. 25, 2021

(51) Int. Cl.
*G06F 12/08* (2016.01)
*G06F 12/0804* (2016.01)
(Continued)

(52) U.S. Cl.
CPC ...... *G06F 12/0804* (2013.01); *G06F 11/2089* (2013.01); *G06F 12/0806* (2013.01); *G06F 12/0866* (2013.01)

(58) Field of Classification Search
CPC ............. G06F 13/4204; G06F 13/4004; G06F 1/3278; G06F 1/3203; G06F 12/0806;
(Continued)

(56) References Cited

U.S. PATENT DOCUMENTS

| 8,601,297 B1 * | 12/2013 | Abts ..................... G06F 1/3253 713/320 |
| 11,113,223 B1 * | 9/2021 | McColgan .......... G06F 13/4022 |

(Continued)

FOREIGN PATENT DOCUMENTS

| EP | 2227749 | 8/2014 | |
| WO | WO-2019055894 A1 * | 3/2019 | ............... H04B 1/04 |

OTHER PUBLICATIONS

"Expanding across time to deliver bandwidth efficiency and low latency", William M. Mellette, Rajdeep Das, Yibo Guo, Rob McGuinness, Alex C. Snoeren, and George Porter University of California San Diego [Technical Report—Mar. 28, 2019] https://circuit-switching.sysnet.ucsd.edu/.*

(Continued)

*Primary Examiner* — Pierre Michel Bataille
(74) *Attorney, Agent, or Firm* — Schwabe, Williamson & Wyatt, P.C.

(57) ABSTRACT

Described is an low overhead method and apparatus to reconfigure a pair of buffered interconnect links to operate in one of these three modes—first mode (e.g., bandwidth mode), second mode (e.g., latency mode), and third mode (e.g., energy mode). In bandwidth mode, each link in the pair buffered interconnect links carries a unique signal from source to destination. In latency mode, both links in the pair carry the same signal from source to destination, where one link in the pair is "primary" and other is called the "assist". Temporal alignment of transitions in this pair of buffered interconnects reduces the effective capacitance of primary, thereby reducing delay or latency. In energy mode, one link (Continued)

in the pair, the primary, alone carries a signal, while the other link in the pair is idle. An idle neighbor on one side reduces energy consumption of the primary.

19 Claims, 11 Drawing Sheets

(51) Int. Cl.
*G06F 12/0866* (2016.01)
*G06F 12/0806* (2016.01)
*G06F 11/20* (2006.01)

(58) Field of Classification Search
CPC ............. G06F 12/0866; G06F 11/2089; G06F 12/0804; G06F 13/4072; Y02D 10/00
See application file for complete search history.

(56) References Cited

U.S. PATENT DOCUMENTS

| | | | |
|---|---|---|---|
| 2008/0104352 A1* | 5/2008 | Talbot | G06F 13/1673 711/167 |
| 2008/0147897 A1* | 6/2008 | Talbot | G06F 13/1673 710/8 |
| 2009/0210883 A1 | 8/2009 | Hoover et al. | |
| 2016/0149780 A1 | 5/2016 | Hsu et al. | |
| 2017/0060151 A1 | 3/2017 | Vaisband et al. | |
| 2017/0063625 A1 | 3/2017 | Philip et al. | |

OTHER PUBLICATIONS

Jih-Sheng Shen, Kuei-Chung Chang and Tien-Fu Chen, "On a design of crossroad switches for low-power on-chip communication architectures," 2006 IEEE International Symposium on Circuits and Systems (ISCAS), 2006, pp. 4-480.*

S. Werner, J. Navaridas and M. Luján, "Designing Low-Power, Low-Latency Networks-on-Chip by Optimally Combining Electrical and Optical Links," 2017 IEEE International Symposium on High Performance Computer Architecture (HPCA), Austin, TX, USA, 2017, pp. 265-27.*

E. J. Kim et al., "A holistic approach to designing energy-efficient cluster interconnects," in IEEE Transactions on Computers, vol. 54, No. 6, pp. 660-671, Jun. 2005.*

Jose, Anup P. et al., "Near Speed-of-Light On-Chip Interconnects Using Pulsed Current-Mode Signalling", 2005 Symposium on VLSI Circuits Digest of Technical Papers, 4 pgs.

Wilson, John M. et al., "A 6.5-to-23.3fJ/b/mm Balanced Charge-Recycling Bus in 16nm FinFET CMOS at 1.7-to-2.6Gb/s/wire with Clock Forwarding and Low-Crosstalk Contraflow Wiring", ISCC 2016, Session 8, Low-Power Digital Circuits, 8.6, 3 pgs.

Zhang, Hui et al., "Low-Swing On-Chip Signaling Techniques: Effectiveness and Robustness", IEEE Transactions on Very Large Scale Integration (VLSI) Systems, vol. 8, No. 3, Jun. 2000, 9 pgs.

International Search Report and Written Opinion from PCT/US2020/047063 dated Nov. 27, 2020, 10 pgs.

* cited by examiner

LOW OVERHEAD, HIGH BANDWIDTH RE-CONFIGURABLE INTERCONNECT APPARATUS AND METHOD

BACKGROUND

Today, a single product design is required to operate at different supply voltages. For example, the same processor is designed to operate at a high voltage supply (e.g., 1.2 V) and a low voltage supply (e.g., 0.5 V). The supply voltage (or voltage range) may be selected and fixed according to the performance and power requirements of a market segment (e.g., tablet, laptop, desktop, etc.). For example, a processor in the desktop market segment may operate at a higher voltage providing higher frequency and processing speed (e.g., higher performance) while the same processor in a tablet or laptop market segment may operate at a lower voltage and at lower frequency and processing speeds. In most cases, a processor may be required to support a range from the minimum operating voltage (VMIN) to a maximum operating voltage (VMAX). Also, the voltage may be adjusted dynamically during operation (e.g., low power mode, normal mode, turbo mode, etc.).

For large heterogeneous platforms, low latency, low energy and high bandwidth network-on-chips (NoCs) are crucial to maintain the performance CAGR (compound annual growth rate) within a power envelope. Despite careful design, NoC fabrics (RING or MESH or other topologies) struggle to meet competing demands on latency, bandwidth and energy, often trading off one for another. Specifically, a NoC fabrics' latency, bandwidth and energy are often limited by long repeated/buffered wires/interconnects. For example, NoC fabrics' latency, bandwidth and energy are in-turn limited by the buffered interconnect that connects two MESH-stops or RING-stops. Buffered interconnects, for instance, constitute a bus of 1000s of wires, and typically span several millimeters across the chip, and undergo DVFS (dynamic voltage and frequency scaling) to achieve the high performance under a power envelope. Buffered interconnects are optimized by carefully selecting inter-repeater distances, buffer sizes, wire layer, wire widths, wire spacing etc. Technology scaling and wide operating range further exacerbate this challenge.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
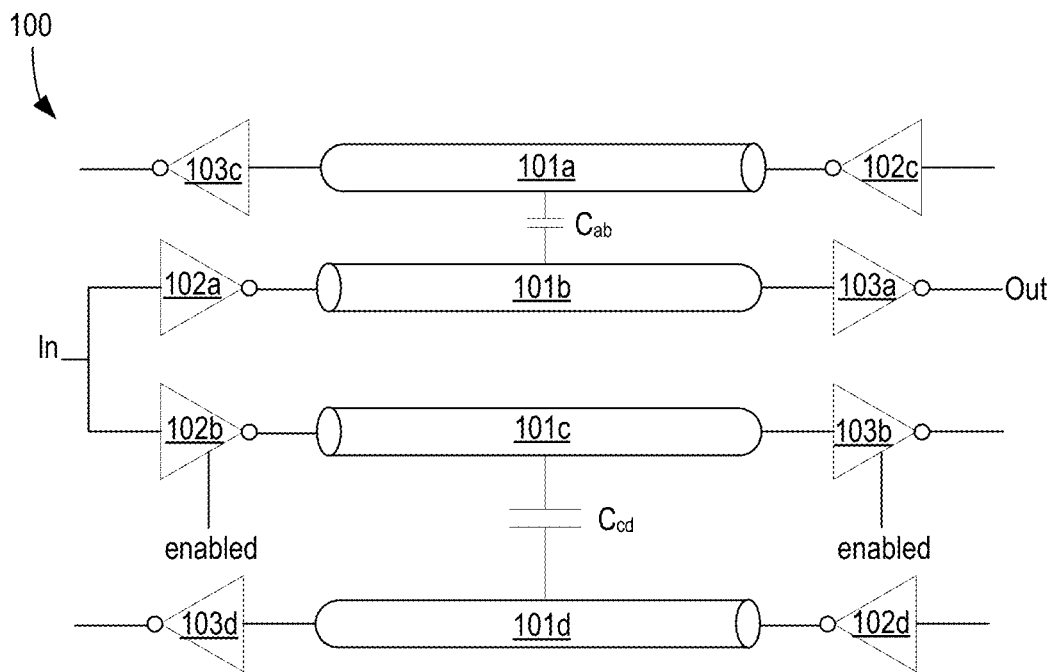
FIG. 1A illustrates a reconfigurable interconnect in a high-speed mode.

The power and performance effects of resistive interconnect depend strongly on the supply voltage. As such, the designs that operate best at low voltages are less efficient operating at high voltages, and vice-versa. Applying one design for different market segments and power modes provides for design and manufacture efficiency, but compromises performance and energy. This compromise may get more severe as interconnect resistance increases with scaling.

Current solutions to designing logic or processors with resistive interconnect are limited to two non-optimal methods. In the first method, the design of the Integrated Circuit (IC) is optimized at a given performance point (e.g., high-performance or low-power). In this case, the other performance target product will suffer significantly operating at sub-optimal power-performance. For example, an IC design optimized to operate at high performance (e.g., high frequency) may result in sub-optimal power efficiency for a product operated at a low voltage and frequency because more power would be consumed than the minimum actually needed to operate with lower performance.

Some embodiments provide a low overhead method and apparatus to reconfigure a pair of buffered interconnect links to operate in one of these three modes—first mode (e.g., bandwidth mode), second mode (e.g., latency mode), and third mode (e.g., energy mode). In bandwidth mode, each link in the pair buffered interconnect links carries a unique signal from source to destination. In latency mode, both links in the pair carry the same signal from source to destination, where one link in the pair is "primary" and other is called the "assist". Temporal alignment of transitions in this pair of buffered interconnects reduces the effective capacitance of primary, thereby reducing delay or latency. In energy mode, one link in the pair, the primary, alone carries a signal, while the other link in the pair is idle. An idle neighbor on one side reduces energy consumption of the primary. These interconnects are part of a MESH or RING network (e.g., in network-on-chip (NOC)). In some embodiments, arbiter circuits (e.g., MESH-stop and RING-stop) work in coordination with a master fabric controller (e.g., in a power management unit) to dynamically adapt the buffered interconnect links to workload needs.

There are many technical effects of various embodiments. For example, the reconfigurable interconnect allows for on-the-fly reconfiguration of fabric latency, bandwidth and energy. While delay and energy can be tuned with dynamic voltage frequency scaling, this reconfigurable interconnect provides a powerful and reliable knob to tune delay (e.g., latency), energy and bandwidth. This reconfigurable interconnect enables these benefits without additional wiring or any new process enhancements or sophisticate custom circuitry. The reconfigurable interconnect provides a potential chip designers to unify physical buffered interconnect link design/optimization, as the same underlying pair of physical links can be controlled and operated in different modes to accomplish a range of latency, bandwidth and energy targets. For example, NoC/fabric interconnect configuration sustains inter-core communication (which includes processor core to lower-level-cache (LLC) communication), core's communication with main memory, core's communication with I/O which means that lower latency and higher bandwidth fabric from the reconfigurable interconnect enables a marked improvement in power-performance for a variety of workloads. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices.

The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The term "scaling" may also refer to adjusting the magnitude of the power supply voltage (e.g., voltage scaling) to the circuit(s).

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

It is to be understood that the terms so used are interchangeable under appropriate circumstances such that the embodiments of the invention described herein are, for example, capable of operation in other orientations than those illustrated or otherwise described herein.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks may be Tunneling FETs (TFETs) or some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used for some transistors without departing from the scope of the disclosure.

As power supply voltage (VDD) for processors or logic increases, a buffered interconnect is more limited by the wire than the device (as device delay decreases with VDD and wire delay does not). To enable lower delay at high-VDD and lower power at low-VDD simultaneously, a reconfigurable interconnect can be used. In a typical reconfigurable interconnect, every buffered interconnect gets another identical buffered interconnect (drivers and wires) as an "assist". Reconfigurable interconnect operates in two modes: high-speed mode and low-energy mode, as shown in FIGS. 1A-B.

FIG. 1A illustrates a reconfigurable interconnect architecture 100 in a high-speed mode. FIG. 1B illustrates a reconfigurable interconnect architecture 120 in a low-energy mode. Architecture 100 illustrates wires 101a, 101b, 101c, and 101d; drivers (inverters) 102a, 102b, 102c, and 102d; and receivers (inverters) 103a, 103b, 103c, and 103d. The reconfigurable part of the interconnect receives input "In" and provides output "Out". The reconfigurable part of the interconnect consists of drivers 102a and 102b, wires 101b and 101c, and receives 103a and 103b, where driver 102b is a tri-state driver (controlled by enable signal) and where receiver 103b is a tri-state receiver controllable by enable signal.

Here, capacitance $C_{ab}$ is the coupling capacitance between wires 101a and 101b, capacitance $C_{bc}$ is the coupling capacitance between wires 101b and 101c, and capacitance $C_{cd}$ is the coupling capacitance between wires 101c and 101d. In high-speed mode, as illustrated by FIG. 1A, temporal alignment of transitions in the primary interconnect 101b and assist 101c interconnect reduces the effective cross coupling capacitance between primary interconnect 101b and assist 101c, thereby reducing delay and energy from input In to output Out. In low-energy mode, as illustrates by FIG. 1B, the assist buffered interconnect is tri-stated and idle, which results in saving energy.

Figure 1B:
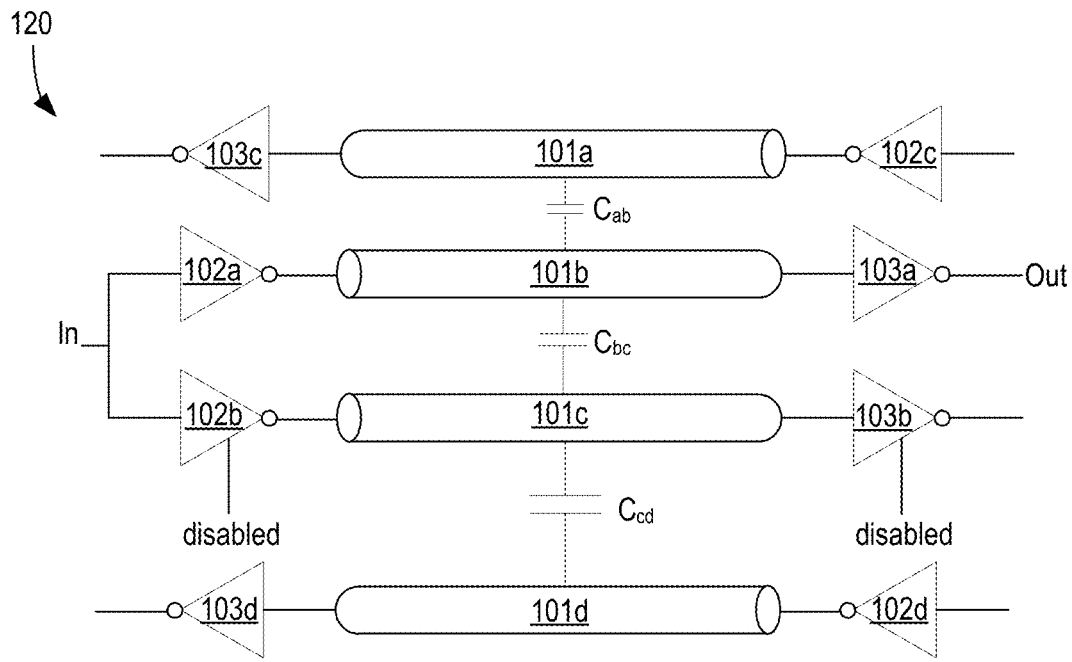
FIG. 1B illustrates a reconfigurable interconnect in a low-energy mode.

Reconfigurable interconnect of FIGS. 1A-B is effective only in scenarios where wiring resources are not constrained. Further, tristate inverters 102b and 103b in the assist paths consume silicon area. For example, high-speed mode configuration of FIG. 1A reduces delay, by reducing effective wire capacitance of the primary interconnect 101b as transitions in primary interconnect 101b and assist interconnect 101c temporally align, the cross coupling capacitance $C_{bc}$ between them is reduced or eliminated. In low-energy mode configuration of FIG. 1B, the assist interconnect 101c is disabled, reducing dynamic power. However, reconfigurable interconnect architectures 100/120 require an additional wiring track for the assist wire 101c.

Figure 2:
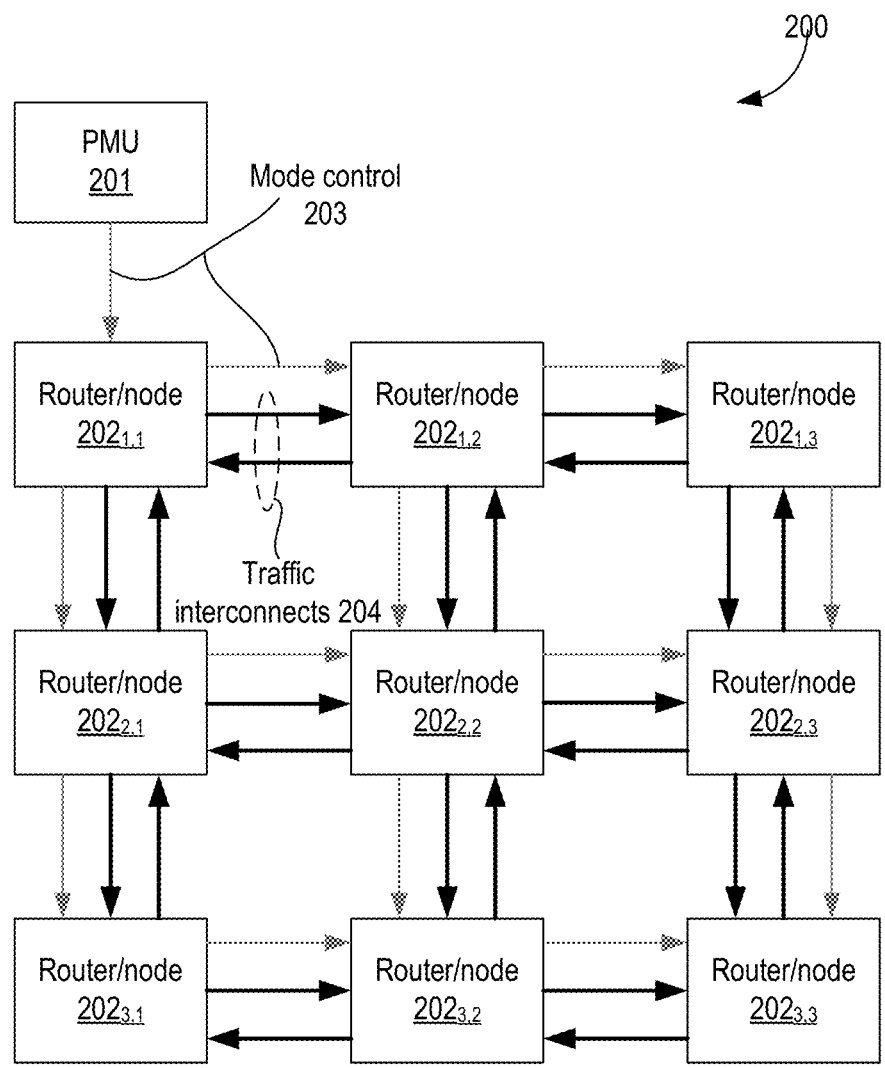
FIG. 2 illustrates a network-on-chip (NoC) comprising a 3×3 MESH with reconfigurable interconnect, in accordance with some embodiments.

FIG. 2 illustrates a network-on-chip (NoC) architecture comprising a 3×3 MESH with reconfigurable interconnect, in accordance with some embodiments. NoC architecture 200 comprises power management unit (PMU) 201 and MESH network comprises routers, nodes, and/or arbiters 202. In this example, a 3×3 MESH network is showing comprising routers, nodes, and/or arbiters $202_{1,1}$ through $202_{3,3}$. Each router, node, and/or arbiter has an interface to receive mode control 203 and an interface (e.g., driver and receiver) to couple with traffic interconnect 204. In some embodiments, buffered interconnects 204 are typically regular inverter paths, no tristate inverters are needed in the assist path, and by extension, no control signals for tristate-inverters. As such, the technique of various embodiments is static timing analysis compatible and readily usable.

In some embodiments, the operating mode for buffered interconnects is determined by the master fabric controller (or power management unit 201), which can be the same unit that also controls DVFS. In some embodiments, controller 201 transmits the mode of operation to every MESH-STOP or RING-STOP. Here, MESH-STOP or RING-STOP are routers, nodes, and/or arbiters 202. As such, MESH-STOPs and RING-STOPs determine and drive signals to the inputs of a pair of buffered interconnects (depending on the operating mode). For example, based on the operating mode, a pair of buffered interconnects are appropriately driven with unique signals (bandwidth mode) or same signals (latency mode) or assist is un-driven (energy mode). In some embodiments, PMU 201 uses operating system (OS) hints and/or on-chip power-performance counters to dynamically determine the operating mode of the interconnect fabric.

For example, for latency critical workloads that are latency critical, the OS issues latency mode to PMU 201 that configures the arbiters to be in latency mode to reduce the delays in NOC to meet the frequency requirement. For latency non-critical workloads, the OS enables PMU 201 to perform DVFS that reduces both supply voltage and frequency to save energy, and the PMU configures arbiters to be in energy mode that reduces energy consumption of the NOC. For workloads that require high bandwidth that could not supported by boosting the operating frequency by DVFS (e.g. data movement, memory access, etc.), PMU 201 can configure the arbiters to be in bandwidth mode that utilize the available interconnects to communicate.

In traditional reconfigurable interconnect such as the one in FIGS. 1A-B, performance-power tuning of the buffered interconnect is typically limited to buffer and wire optimizations. In some embodiments, MESH-STOP can also influence delay and energy of the buffered interconnect by controlling the operating mode. This provides a knob for micro-architects and architects to tune fundamental fabric parameters.

Compared to other logic controllers, master fabric controller such as PMU 201 can better react to bandwidth or latency demands by controlling the MESH-stops, and in-turn, the operating modes for buffered interconnect links. This provides an additional degree of freedom beyond operating-VDD and frequency (with DVFS).

Figure 3:
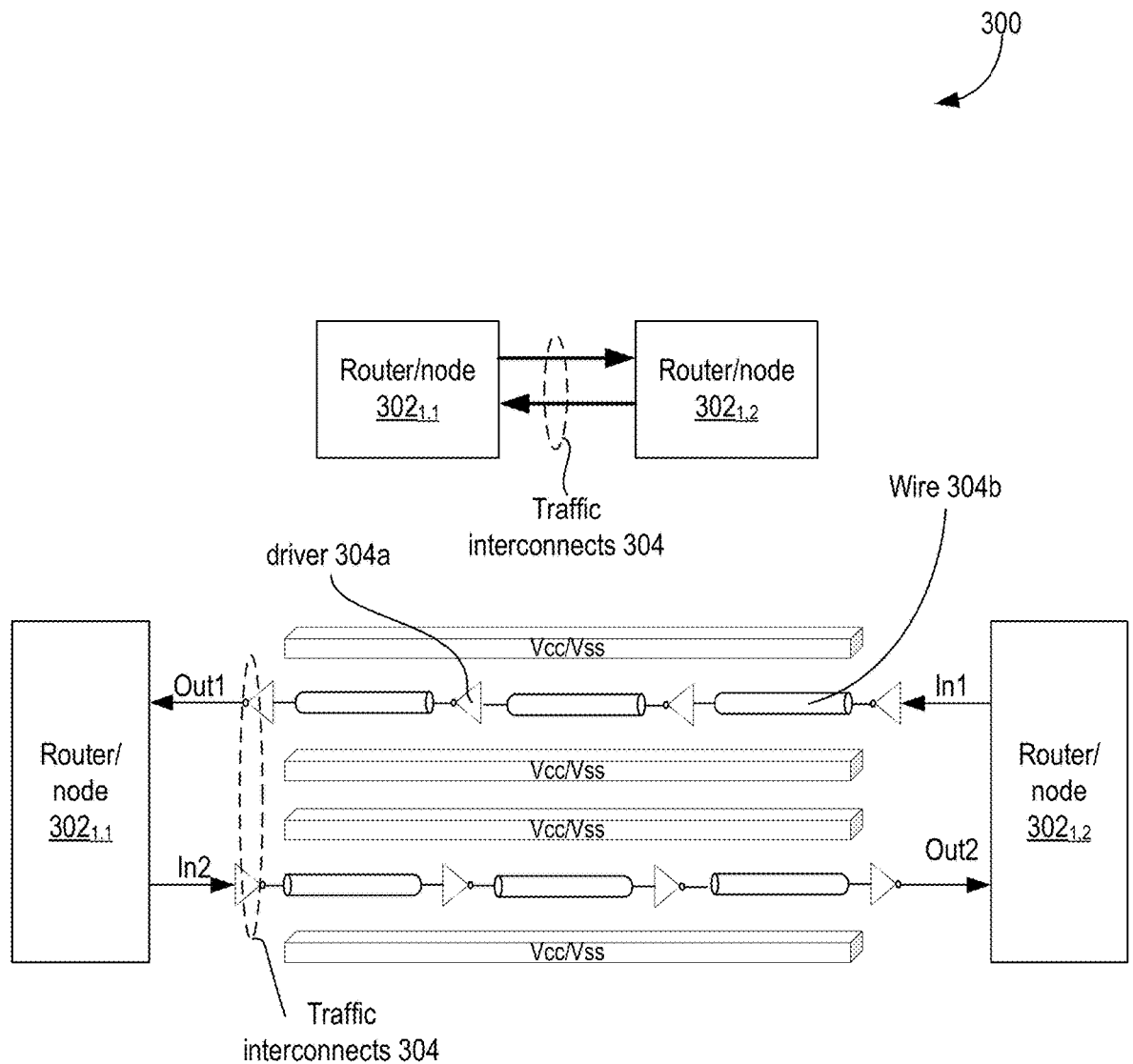
FIG. 3 illustrates with baseline repeated bus interconnect design.

FIG. 3 illustrates with baseline repeated bus interconnect design 300. Baseline design 300 illustrates an example of interconnects between two possible MESH or RING stops. In this example, the MESH or RING stops are router (node or arbiter) $302_{1,1}$ and $302_{1,2}$. Two signal paths (or traffic interconnects) 304 are shown. The first signal path begins from input In1 and ends at output Out1. The second signal path begins from input In2 and ends at output Out2. Each signal path is a repeated bus interconnect with optimized inter-repeater distance, repeater size, wire layer, width and inter-wire space. In this example, repeaters 304a are shown as inverters (which can also be implemented as non-inverting buffers) and wires 304b. Passive shields are used to reduce Miller coupling capacitance between neighboring wires. In this example, the passive shields are power supply (Vcc) or ground (Vss) interconnects. Running signals in opposite directions also reduces Miller coupling capacitance. In this example, signal In1 propagates from right to left while signal In2 propagates from left to right.

Figure 4:
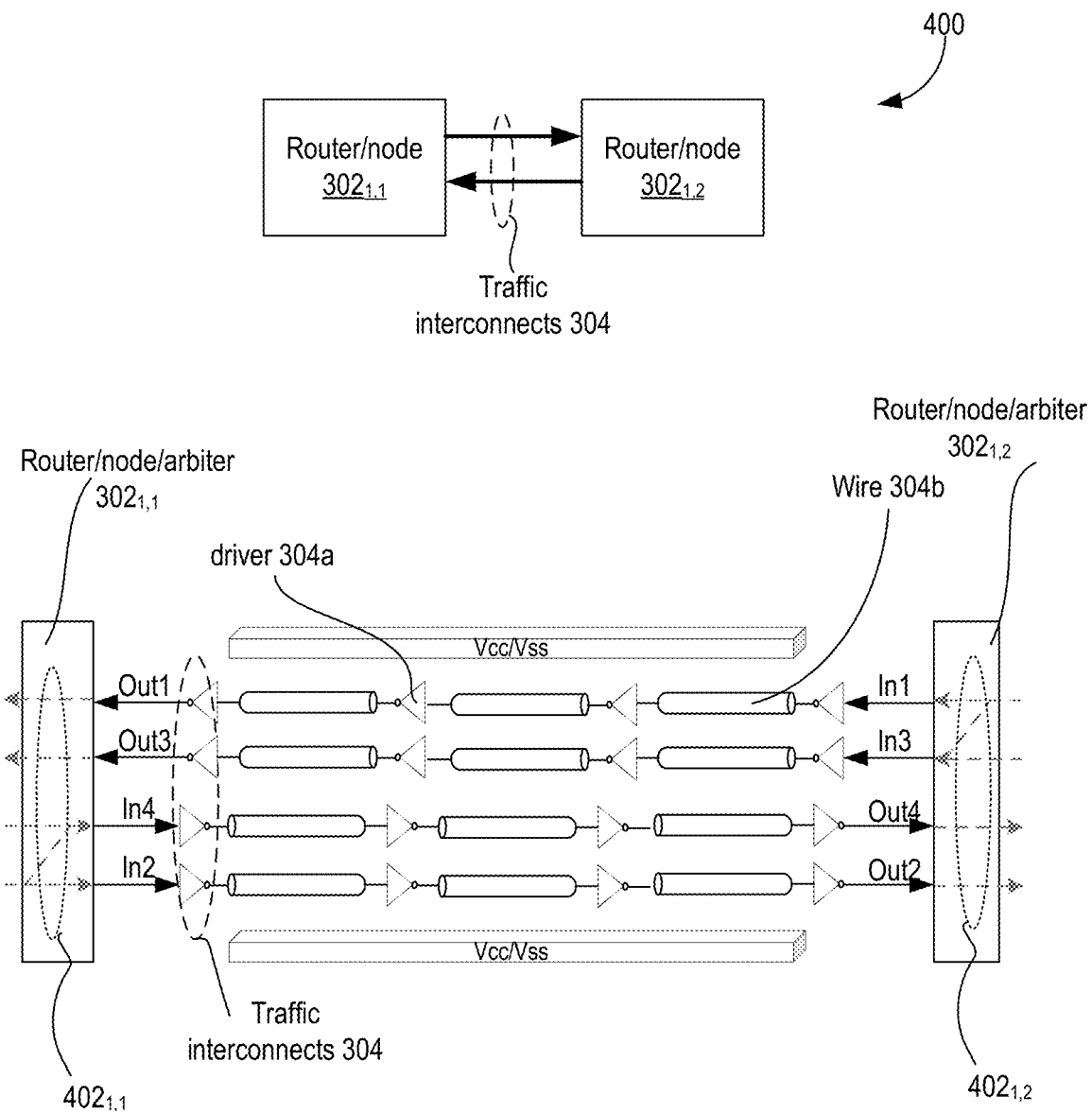
FIG. 4 illustrates a tri-modal reconfigurable interconnect, in accordance with some embodiments.

FIG. 4 illustrates a tri-modal reconfigurable interconnect 400, in accordance with some embodiments. In this example, 2×repeated wires are shown that form a pack of signal paths that are shield by Vcc or Vss interconnects. The first signal path begins from input In1 and ends at output Out1. The second signal path begins from input In2 and ends at output Out2. The third signal path begins from input In3 and ends at output Out4. The fourth signal path begins from input In4 and ends at output Out4. The second and fourth signal paths propagate signal(s) from arbiter $301_{1,1}$ to arbiter $302_{1,2}$, while first and third signal paths propagate signal(s) from arbiter $301_{1,2}$ to arbiter $302_{1,1}$. While the embodiments illustrate signal paths between arbiter 3011,1 and arbiter $302_{1,2}$, the embodiments are applicable to signal transmission between any MESH or RING stops. In various embodiments, arbiter $301_{1,1}$ determine the input signals that drive In3 and In4, thereby, sets up the operating mode—bandwidth mode, latency mode and energy mode. Table 1 summarizes the modes.

TABLE 1

| Mode | IN1 | IN2 | IN3 | IN4 | #Unique Signals |
|---|---|---|---|---|---|
| Bandwidth | IN1 | IN2 | IN3 | IN4 | 4 |
| Latency | IN1 | IN2 | IN1 | IN2 | 2 |
| Energy | IN1 | IN2 | NOT-DRIVEN | NOT-DRIVEN | 2 |

In some embodiments, a controller (e.g., PMU 201 or any other network controller) generate a mode signal 203. This mode signal 203 is multi-bit signal that indicates a mode of operation for first and second of two or more interconnects. For example, mode signal 203 sets the operating mode of signal paths In1-to-Out1, In3-to-Out3, In2-to-Out2, and In4-to-Out4, where signal paths In1-to-Out1 and In3-to-Out3 are part of the first two or more interconnects, and where signal paths In2-to-Out2 and In4-to-Out4 are part of the second two or more interconnects. In various embodiments, propagation delay of the signal paths in a particular direction is identical (or substantially the same). For example, signal paths In2-to-Out2 and In4-to-Out4 have the same (or substantially the same) propagation delay, while signal paths In1-to-Out1 and In3-to-Out3 have the same (or substantially the same) propagation delay.

The mode of operation can be a first mode, a second mode, or a third mode. Various embodiments are described with reference to the mode signal being a 2-bit signal with first mode being the bandwidth mode, the second mode being the latency mode, and the third mode being the energy mode. However, embodiments are not limited to these modes. Arbiters 402 (e.g., $402_{1,1}$, and $402_{1,2}$) can be configured to implement more modes than three modes. In one such embodiment, more signal paths are provided between arbiters and the bit size of mode control signal 203 can be greater than two bits.

The first arbiter $402_{1,2}$ is communicatively coupled to controller 201. For example, mode control 203 is provided to first arbiter $402_{1,2}$ and as such a communicative coupling is achieved. In some embodiments, first arbiter $402_{1,2}$ is to configure the first of two or more interconnects (e.g., In1-to-Out1 and In3-to-Out3) to be in one of the first, second or third modes. For example, depending on the bit value of mode control signal 203, first arbiter $402_{1,2}$ sets inputs In1 and In3 nodes to be independent to carry unique signals through their respective signal paths, shorted to carry the same signal through their respective signal paths, or one of them is electrically opened to cause only one signal path to be active.

In some embodiments, second arbiter $402_{1,1}$ is communicatively coupled to controller 201 just like the first arbiter $402_{1,2}$ is communicatively coupled to controller 201. In some embodiments, second arbiter $402_{1,1}$ is to configure the second of two or more interconnects (e.g., In2-to-Out2, and In4-to-Out4) to be in one of the first, second or third modes. For example, depending on the bit value of mode control signal 203, second arbiter $402_{1,1}$ sets inputs In2 and In4 nodes to be independent to carry unique signals through their respective signal paths, shorted to carry the same signal through their respective signal paths, or one of them is electrically opened to cause only one signal path to be active.

In various embodiments, the modes of operation set by the first and second arbiters is the same mode of operation. For example, first arbiter $402_{1,2}$ and second arbiter $402_{1,1}$ cause the signal paths (e.g., first of two or more interconnect, and second of two or more interconnects) to be in bandwidth mode, latency mode, or energy mode. In some embodiments, the modes of operation set by the first and second arbiters are different modes of operation.

In various embodiments, at least one of the first of two or more interconnects and at least one of the second of two or more interconnects is shielded by a power supply line (Vcc) or a ground line (Vss). In this example, signal path In1-to-Out1 is shielded by one of Vcc or Vss, while signal path In2-to-Out2 is shielded by one of Vcc or Vss.

In some embodiments, in the first mode (e.g., bandwidth mode), first arbiter $402_{1,2}$ and second arbiter $402_{1,1}$ are to cause propagation of separate signals on the first and second of the two or more interconnects. For example, each signal path carries a unique signal. In this example, four different signals can be propagated between the two arbiters in bandwidth mode.

In some embodiments, in the second mode (e.g., latency mode), first arbiter $402_{1,2}$ and second arbiter $402_{1,1}$ are to cause propagation of first same signals on the first of two or more interconnects, and second same signals on the second of two or more interconnects. For example, In1 and In3 are the same signals that propagate from arbiter $402_{1,2}$ to arbiter $402_{1,1}$, and In2 and In4 are the same signals that propagate from arbiter $402_{1,1}$ to arbiter $402_{1,2}$.

In some embodiments, in the third mode (e.g., energy mode), first arbiter $402_{1,2}$ and second arbiter $402_{1,1}$ are to cause propagation of signals on alternate first of two or more interconnects and alternate of second of two or more interconnects. For example, signal path In1-to-Out1 is enabled but signal path In3-to-Out3 is disabled. Likewise, signal path In2-to-Out2 is enabled while signal path In4-to-Out4 is disabled.

In various embodiments, arbiters can be implemented using any suitable logic such as multiplexers, pass-gates, tri-state buffers or inverters, NAND gates, NOR gates, etc., that are controllable by mode control 203 which routes traffic on interconnects 304 in accordance with the bit value of mode control 203.

Figure 5:
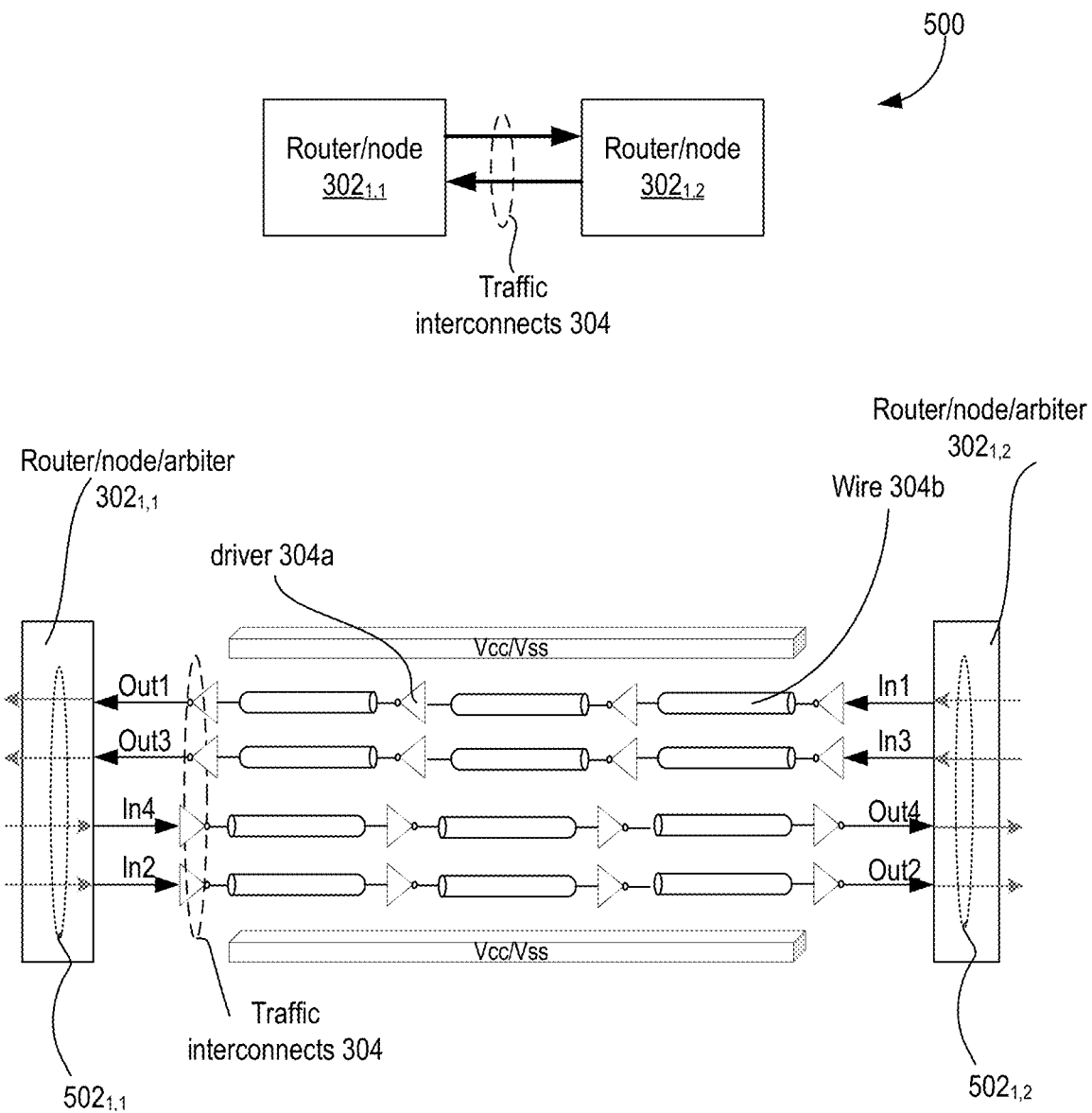
FIG. 5 illustrates a tri-modal reconfigurable interconnect in bandwidth mode, in accordance with some embodiments.

FIG. 5 illustrates tri-modal reconfigurable interconnect 500 in bandwidth mode, in accordance with some embodiments. In this configuration, high bandwidth is achieved relative to a single signal path. Each physical link carries a unique logical signal. In this example, 4 physical wires are packed within the same wiring resource. Here, arbiter $301_{1,1}$ and arbiter $302_{1,2}$ are configured (as indicated by signal routers $502_{1,1}$ and $502_{1,2}$) so that inputs In1, In2, In3, and In4 carry unique signals.

Figure 6:
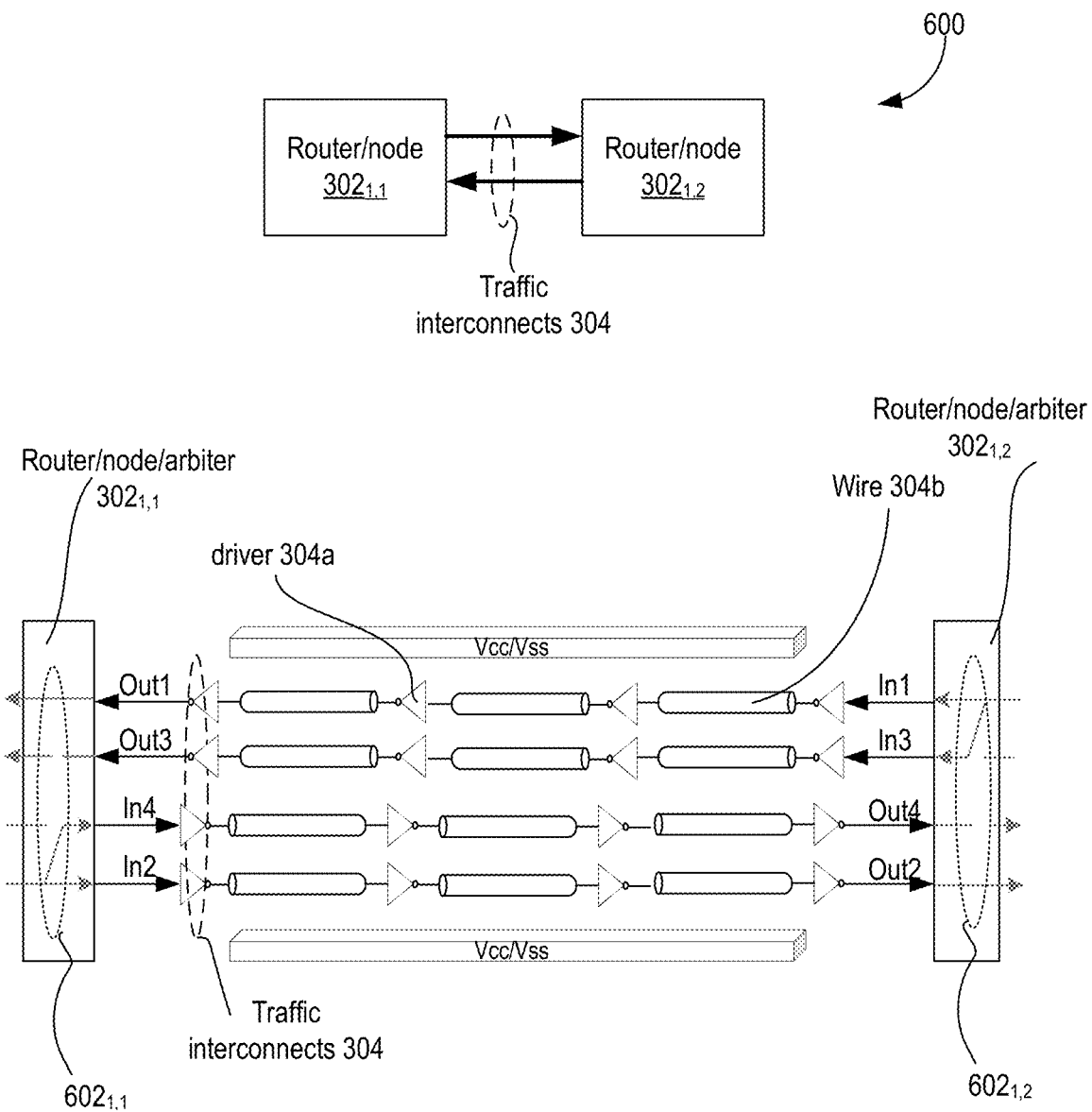
FIG. 6 illustrates a tri-modal reconfigurable interconnect in latency mode, in accordance with some embodiments.

FIG. 6 illustrates tri-modal reconfigurable interconnect 600 in latency mode, in accordance with some embodiments. Neighbor (e.g., signal path IN3) is repurposed as an assist path for signal path IN1. Here, arbiter $301_{1,1}$ and arbiter $302_{1,2}$ are configured (as indicated by signal routers $602_{1,1}$ and $602_{1,2}$) so that IN1 and IN4 carry the same signals, and In1 and In3 carry the same signals. By using parallel signal paths, cross-coupling capacitance between signals paths is reduced. Signal transitions in assist path (IN3) and primary path (IN1) temporally align leading to an effective reduction (and in best case elimination) of the coupling capacitance between IN1 and IN3. Driver sizes and wire layout are identical (or substantially identical (for IN1 and IN3 to enable close matching. Despite that if there is temporal mismatch in signal transitions between IN1 and IN3, the delay benefit degrades gracefully.

Figure 7:
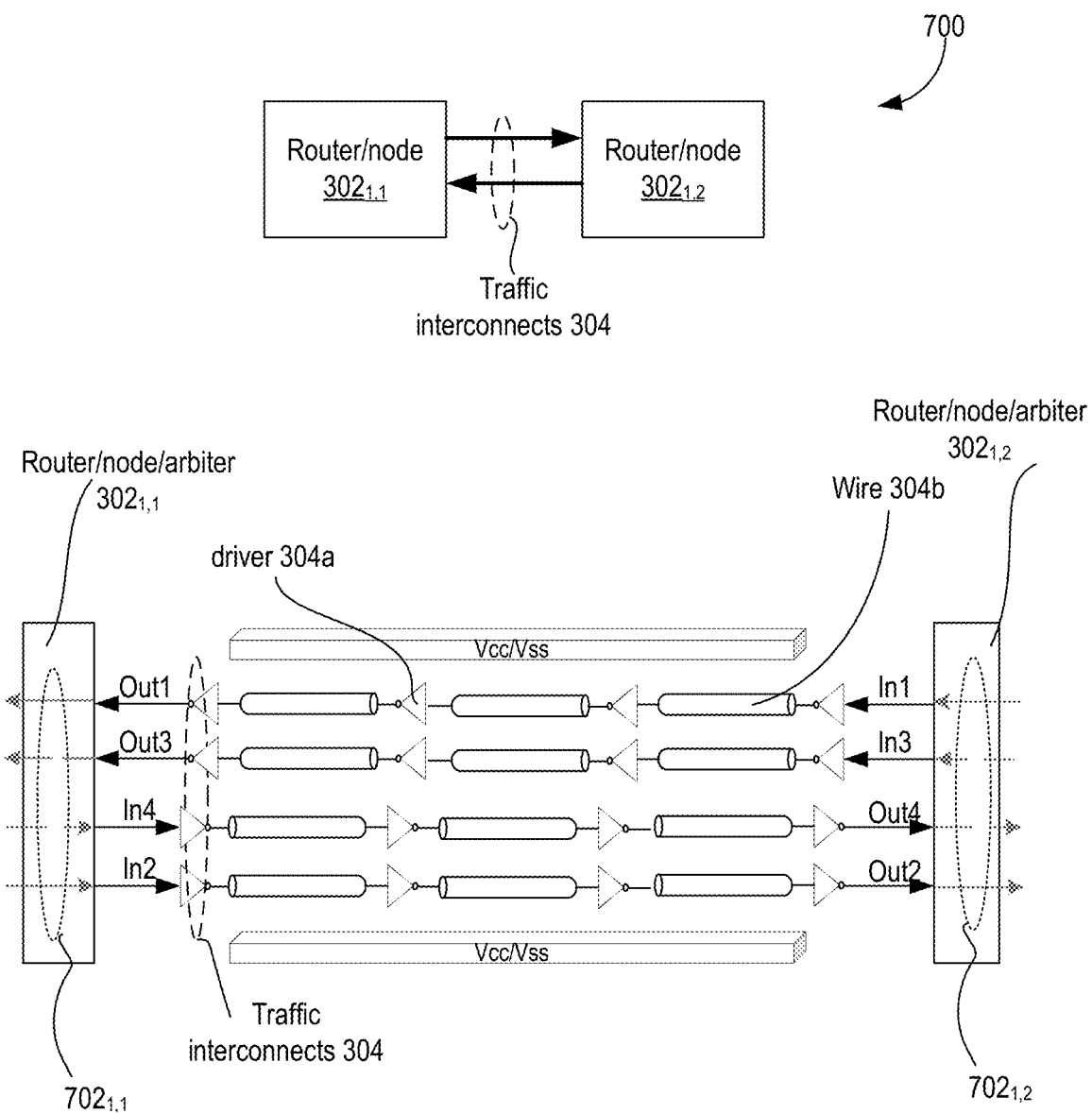
FIG. 7 illustrates a tri-modal reconfigurable interconnect in energy mode, in accordance with some embodiments.

FIG. 7 illustrates tri-modal reconfigurable interconnect 700 in energy mode, in accordance with some embodiments. Here, arbiter $301_{1,1}$ and arbiter $302_{1,2}$ are configured (as indicated by signal routers $702_{1,1}$ and $702_{1,2}$) to enable alternating signal paths. As such, signal path carrying a signal is shielded by non-switching signal paths. This configuration not only enables low energy mode because fewer signal paths are switching, it also allows for shielding important signals (e.g., hard reset signal) from noise. In this case, neighbor signal path (IN3) does not switch, and merely signal path IN1 switches saving energy when workloads don't demand low latency or high bandwidth.

Figure 8A:
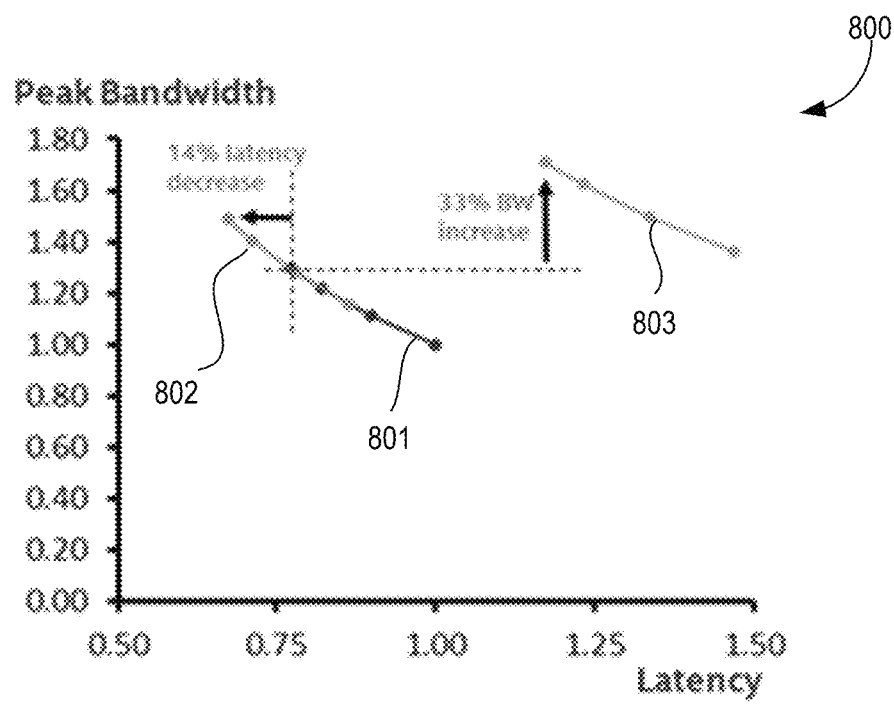
FIGS. 8A-B illustrate plots showing bandwidth mode and latency mode, respectively, in accordance with some embodiments.
Figure 8B:
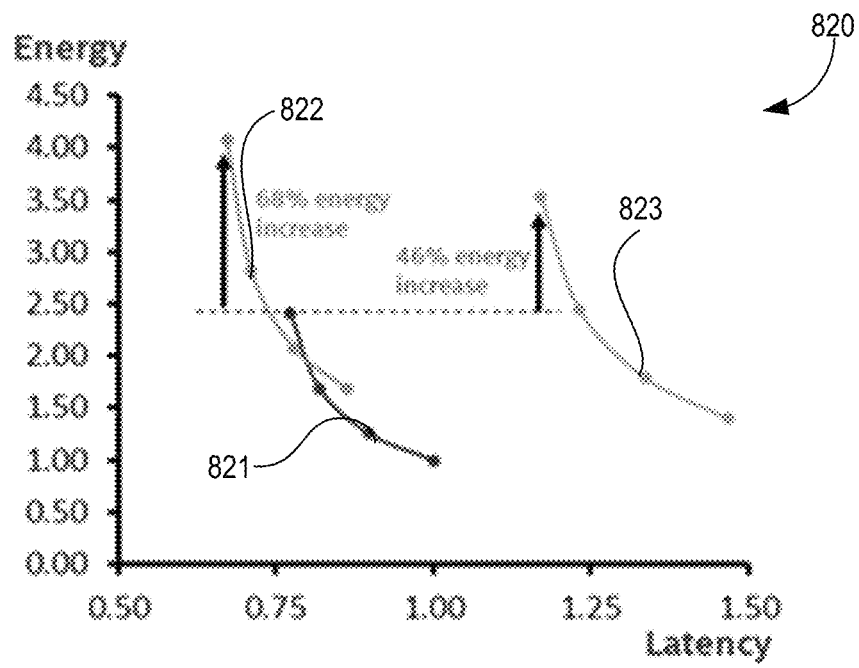

FIGS. 8A-B illustrate plots 800 and 820, respectively, showing bandwidth mode and latency mode, respectively, in accordance with some embodiments. Plot 800 compares peak bandwidth versus latency for typical interconnect 801, reconfigurable interconnect in latency mode 802, and reconfigurable interconnect in bandwidth mode 803. The plots show performance of a tri-modal reconfigurable interconnect for a latency critical server MESH link. Here, the four points in each curve are different VDD points: 0.65V, 0.75V, 0.9V and 1.1V. Plot 800 shows that in bandwidth mode we can increase peak bandwidth by as much as 33%, at the expense of 46% energy over 801. Plot 820 compares energy versus latency for typical interconnect 821, reconfigurable interconnect in latency mode 822, and reconfigurable interconnect in bandwidth mode 823. Plot 820 shows that in latency mode, link latency can be reduced by 14%, at the expense of 68% increase in energy. Note, in this example, if both are not desired then the reconfigurable interconnect can be in energy mode with less than 5% increase in latency.

Figure 9A:
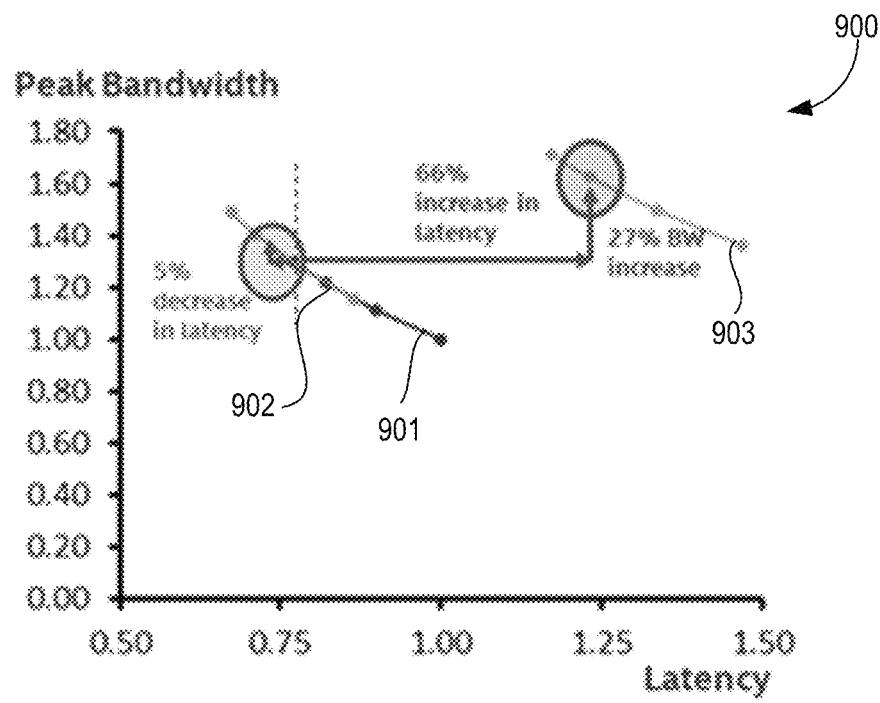
FIGS. 9A-B illustrate plots showing bandwidth mode and latency mode, respectively, in accordance with some embodiments.
Figure 9B:
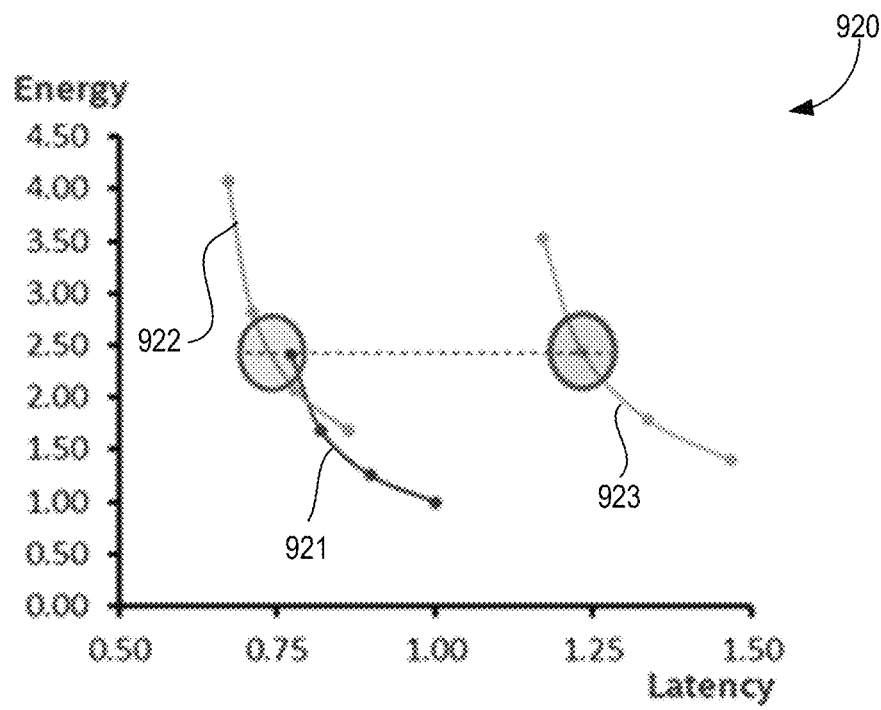

FIGS. 9A-B illustrate plots 900 and 920, respectively, showing bandwidth mode and latency mode, respectively, in accordance with some embodiments. Plot 900 compares peak bandwidth versus latency for typical interconnect 901, reconfigurable interconnect in latency mode 902, and reconfigurable interconnect in bandwidth mode 903. The plots show performance of a tri-modal reconfigurable interconnect for a latency critical server MESH link. For example, plots 900 and 920 show that benefits can be reaped even under a fixed energy budget as shown by different points in a curve are different VDD points: 0.65V, 0.75V, 0.9V and 1.1V. The peak bandwidth vs latency plot 900 shows that in bandwidth mode, even under an energy constraint e.g., (maximum energy consumed by a link 901), there is a 27% increase in bandwidth. Plot 920 compares energy versus latency for typical interconnect 921, reconfigurable interconnect in latency mode 922, and reconfigurable interconnect in bandwidth mode 923. Plot 920 shows that in latency mode, link latency can be reduced by 5% with no increase in energy. Note that a more sophisticated (all-to-all) arbiter can also dynamically support 2× and 3× tri-modal reconfigurable interconnect. Here, all-to-all arbiter refers to an arbiter that can communicate with all other arbiters directly.

Figure 10:
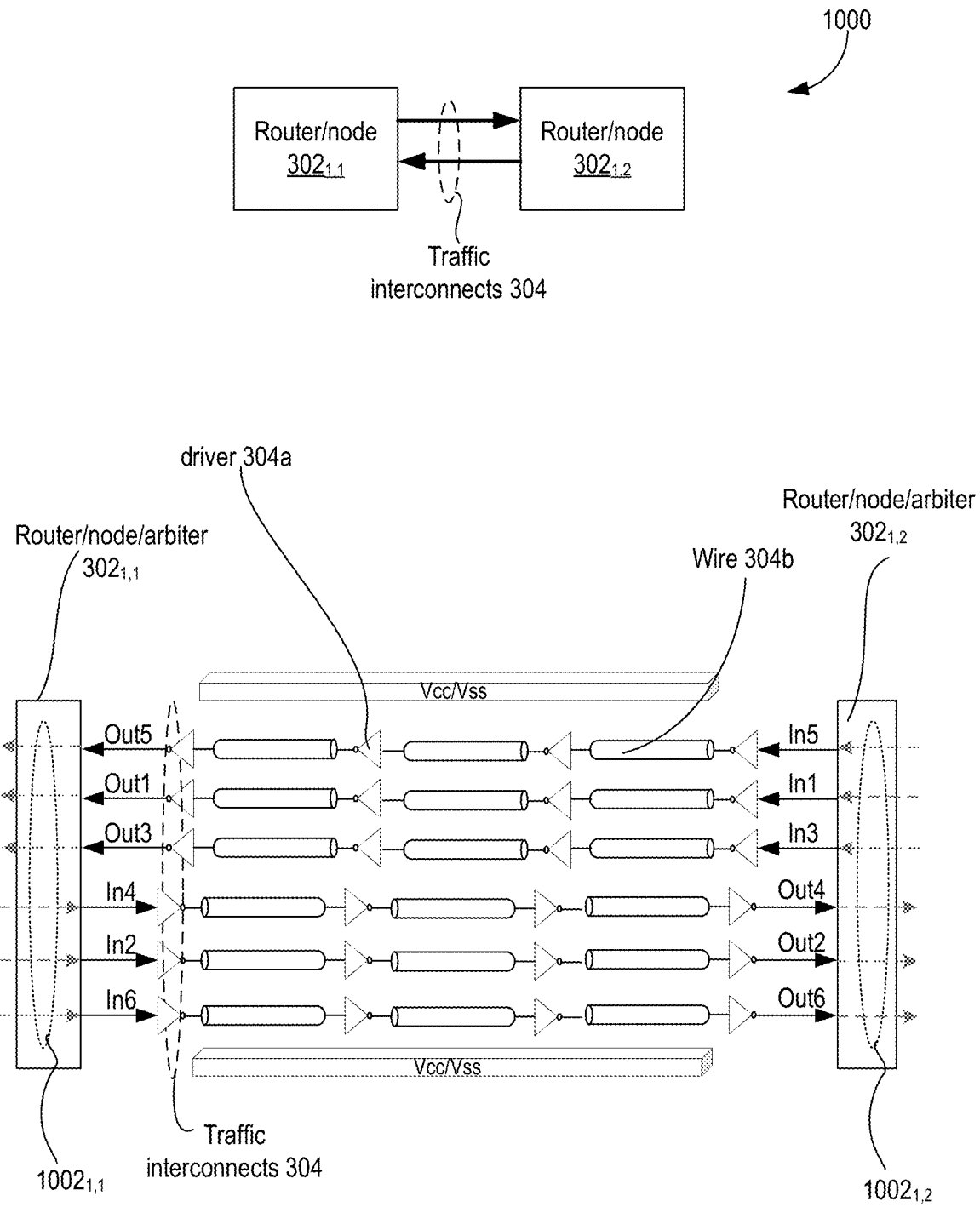
FIG. 10 illustrates a tri-modal reconfigurable interconnect with 3x repeated wires, in accordance with some embodiments.

FIG. 10 illustrates tri-modal reconfigurable interconnect 1000 with 3× repeated wires, in accordance with some embodiments. In an alternate embodiment of this invention, instead of dynamically reconfiguring a pair of buffered interconnects, three buffered interconnects can be configured into three operating modes—bandwidth, latency and energy. A similar scheme can be used to configure 'n' buffered interconnects, where 'n'; is greater than 3. In some embodiments, arbiter $1002_{1,1}$ and $1002_{1,2}$ determines the input signals that drive IN3, IN4, INS and IN4, thereby, sets up the operating mode—bandwidth mode, latency mode and energy mode. Table 2 summarizes the modes. Latency reduction, energy reduction and bandwidth increase possible with 3× tri-modal reconfigurable interconnect may be higher than baseline for certain buffered interconnect configurations.

TABLE 2

| Mode | IN1 | IN2 | IN3 | IN4 | IN5 | IN6 | #Unique Signals |
|---|---|---|---|---|---|---|---|
| Bandwidth | IN1 | IN2 | IN3 | IN4 | IN5 | IN6 | 6 |
| Latency | IN1 | IN2 | IN1 | IN2 | IN1 | IN2 | 2 |
| Energy | IN1 | IN2 | NOT-DRIVEN | NOT-DRIVEN | NOT-DRIVEN | NOT-DRIVEN | 2 |

Figure 11:
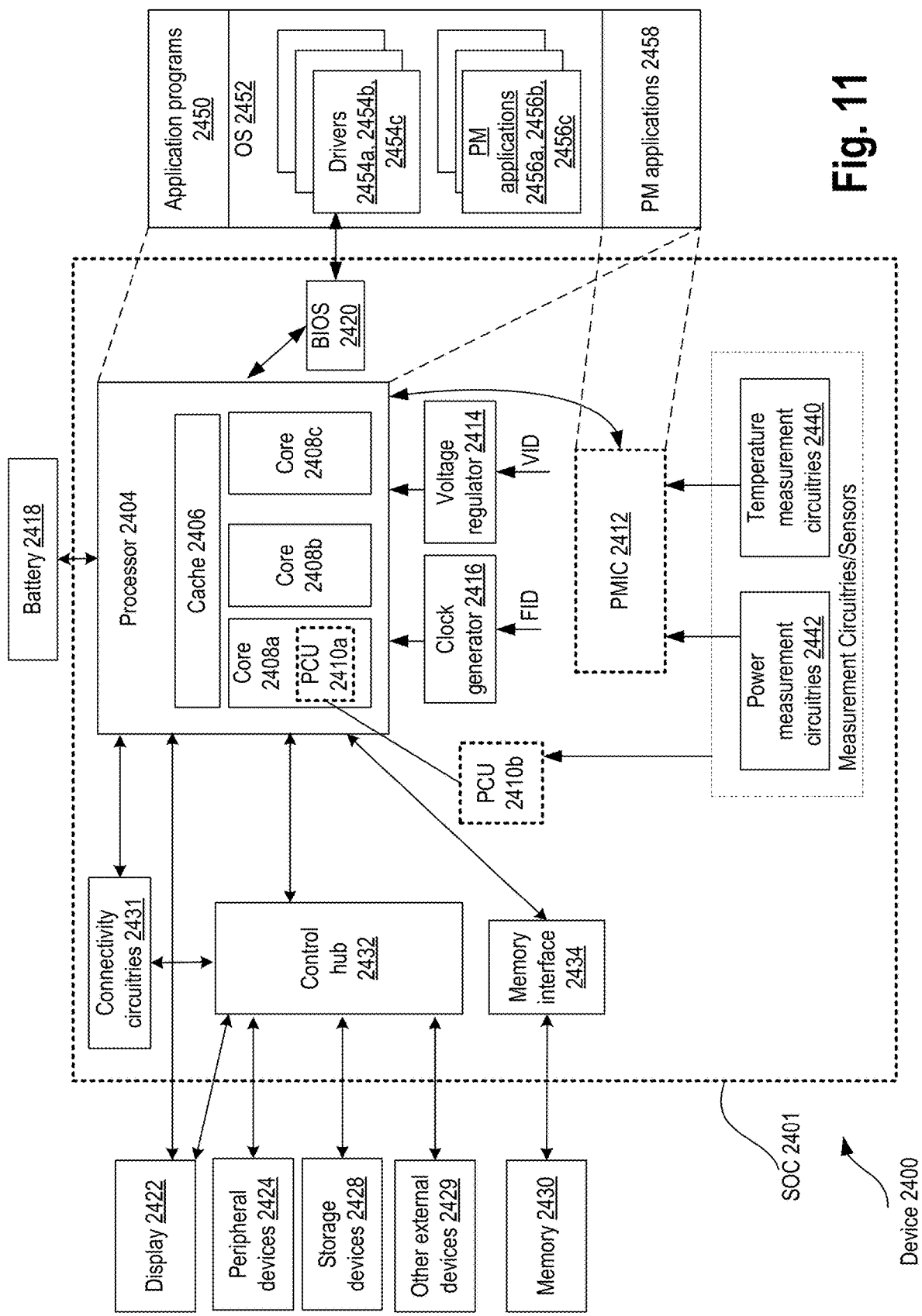
FIG. 11 illustrates an SOC or NoC with tri-modal reconfigurable interconnect, in accordance with some embodiments.

FIG. 11 illustrates an SOC or NoC 2400 with tri-modal reconfigurable interconnect, in accordance with some embodiments. In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400. Any blocks of FIG. 11 can have tri-modal reconfigurable interconnect of various embodiments.

In an example, the device 2400 comprises a SoC (System-on-Chip) 2401. An example boundary of the SOC 2401 is illustrated using dotted lines in FIG. 15, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 15, the processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 2404 may also include a bus unit to enable communication between components of the processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 2410 a/b and/or PMIC 2412. In some embodiments, each core has a network of distributed LDOs to provide efficient control for power management. The LDOs can be digital, analog, or a combination of digital or analog LDOs.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals. Clock generator 2416 is an adaptive clock source that can provide an adaptive frequency output as discussed with reference to various embodiments.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporarily for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1: An apparatus comprising: a controller to generate a mode signal, wherein the mode signal indicates a mode of operation for first and second of two or more interconnects, wherein the mode of operation includes one of: a first mode, a second mode, or a third mode; and a first arbiter communicatively coupled to the controller, wherein the first arbiter is to configure the first of two or more interconnects to be in one of the first, second or third modes; and a second arbiter communicatively coupled to the controller, wherein the second arbiter is to configure the second of two or more interconnects to be in a same mode as the first of two or more interconnects.

Example 2: The apparatus of example 1, wherein the first and second arbiters are operable to: short inputs of the first of two or more interconnects; connect inputs of the first of two or more interconnects to input ports or output ports of the first or second arbiter; or disconnect inputs of one of the first of two or more interconnects to input ports or output ports of the first or second arbiter.

Example 3: The apparatus of example 1, wherein at least one of the first of two or more interconnects and at least one of the second of two or more interconnects is shielded by a power supply line or a ground line.

Example 4: The apparatus of example 1, wherein the first mode is a bandwidth mode, wherein the first and second arbiters are to cause propagation of separate signals on the first and second of the two or more interconnects.

Example 5: The apparatus of example 1, wherein the second mode is a latency mode, wherein the first and second arbiters are to cause propagation of first same signals on the first of two or more interconnects, and second same signals on the second of two or more interconnects.

Example 6: The apparatus of example 1, wherein the third mode is an energy mode, wherein the first and second arbiters are to cause propagation of signals on alternate first of two or more interconnects and alternate of second of two or more interconnects.

Example 7: The apparatus of example 1, wherein the controller is a power management unit, which also is operable to perform dynamic voltage and frequency scaling.

Example 8: An apparatus comprising: a power management unit (PMU) to generate a mode control; and a mesh network of arbiters coupled to the PMU, wherein the mesh network of arbiters include: a first arbiter communicatively coupled to the PMU and to receive the mode control; a second arbiter communicatively coupled to the PMU and to receive the mode control; a first pair of signal paths having a first driver and a second driver coupled to the first arbiter, and a first receiver and a second receiver coupled to the second arbiter; and a second pair of signal paths having a third driver and a fourth driver coupled to the second arbiter, and a third receiver and a fourth receiver coupled to the first arbiter; wherein first and second arbiters are to configure the first and second signal paths to be in one of the first, second or third modes according to the mode control.

Example 9: The apparatus of claim 8, wherein the PMU is to perform dynamic voltage and frequency scaling.

Example 10: The apparatus of claim 8, wherein the first and second arbiters are operable to: connect each input of the first pair of signal paths to each input port or output port of the first or second arbiter; or short inputs of the first pair of signal paths to a same signal port of the first or second arbiter.

Example 11: The apparatus of claim 8, wherein the first and second arbiters are operable to: open one electrical path of an input of one of the signal paths of the first pair of signal path; or connect each input of the first pair of signal paths to each input port or output port of the first or second arbiter.

Example 12: The apparatus of claim 8, wherein the first and second arbiters are operable to: connect each input of the second pair of signal paths to each input port or output port of the first or second arbiter; or short inputs of the second pair of signal paths to the same signal port of the first or second arbiter.

Example 13: The apparatus of claim 8, wherein the first and second arbiters are operable to: open one electrical path of an input of one of the signal paths of the second pair of signal path; or connect each input of the first pair of signal paths to each input port or output port of the first or second arbiter.

Example 14: The apparatus of claim 8, wherein the first mode is a bandwidth mode, wherein the first and second arbiters are to cause propagation of separate signals on the first and second pair of signal paths.

Example 15: The apparatus of claim 8, wherein the second mode is a latency mode, wherein the first and second arbiters are to cause propagation of first same signals on the first pair of signal paths, and second same signals on the second pair of signal paths.

Example 16: The apparatus of claim 8, wherein the third mode is an energy mode, wherein the first and second arbiters are to cause propagation of signals on alternate signal paths of the first and second pairs of the signal pair paths.

Example 17: A system comprising: a memory; a processor core coupled to the memory; a power management unit (PMU) coupled to the core and to perform dynamic voltage and frequency scaling on the processor core; a network-on-chip (NOC) comprising mesh or ring networks, wherein the NOC includes: a network of arbiters coupled to the PMU, wherein the network of arbiters include: a first arbiter communicatively coupled to the PMU and to receive the mode control; a second arbiter communicatively coupled to the PMU and to receive the mode control; a first pair of signal paths having a first driver and a second driver coupled to the first arbiter, and a first receiver and a second receiver coupled to the second arbiter; and a second pair of signal paths having a third driver and a fourth driver coupled to the second arbiter, and a third receiver and a fourth receiver coupled to the first arbiter, wherein first and second arbiters are to configure the first and second signal paths to be in one of the first, second or third modes according to the mode control; and a wireless interface to allow the processor core to communicate with another device.

Example 18: The system of claim 17, wherein the first mode is a bandwidth mode, wherein the first and second arbiters are to cause propagation of separate signals on the first and second pair of signal paths.

Example 19: The system of claim 17, wherein the second mode is a latency mode, wherein the first and second arbiters are to cause propagation of first same signals on the first pair of signal paths, and second same signals on the second pair of signal paths.

Example 20: The system of claim 17, wherein the third mode is an energy mode, wherein the first and second arbiters are to cause propagation of signals on alternate signal paths of the first and second pairs of the signal pair paths.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a controller to generate a mode signal, wherein the mode signal indicates a mode of operation for a first set of two or more interconnects and a second set of two or more interconnects, wherein the mode of operation includes one of: a first mode, a second mode, or a third mode;
   a first arbiter communicatively coupled to the controller, wherein the first arbiter is to configure the first set of two or more interconnects to be in one of the first, second, or third modes; and
   a second arbiter communicatively coupled to the controller, wherein the second arbiter is to configure the second set of two or more interconnects to be in a same mode as the first set of two or more interconnects, p1 wherein the first and second arbiters are operable to:
   short inputs of the first set of two or more interconnects;
   connect inputs of the first set of two or more interconnects to input ports or output ports of the first or second arbiter; or
   disconnect an input of one of the first set of interconnects from input ports or output ports of the first or second arbiter.

2. The apparatus of claim 1, wherein at least one of the first set of two or more interconnects and at least one of the second set of two or more interconnects is shielded by a power supply line or a ground line.

3. The apparatus of claim 1, wherein the first mode is a bandwidth mode, wherein the first and second arbiters are to cause propagation of separate signals on the respective first and second sets of two or more interconnects.

4. The apparatus of claim 1, wherein the second mode is a latency mode, wherein the first and second arbiters are to cause propagation of first same signals on the first set of two or more interconnects, and second same signals on the second set of two or more interconnects.

5. The apparatus of claim 1, wherein the third mode is an energy mode, wherein the first and second arbiters are to cause propagation of signals on alternate interconnects of the first set of two or more interconnects and alternate interconnects of the second set of two or moreinterconnects.

6. The apparatus of claim 1, wherein the controller is a power management unit, which also is operable to perform dynamic voltage and frequency scaling.

7. An apparatus comprising:
   a power management unit (PMU) to generate a mode control; and
   a mesh network of arbiters coupled to the PMU, wherein the mesh network of arbiters include:
   a first arbiter communicatively coupled to the PMU and to receive the mode control;
   a second arbiter communicatively coupled to the PMU and to receive the mode control;
   a first pair of signal paths having a first driver and a second driver coupled to the first arbiter, and a first receiver and a second receiver coupled to the second arbiter; and
   a second pair of signal paths having a third driver and a fourth driver coupled to the second arbiter, and a third receiver and a fourth receiver coupled to the first arbiter; wherein the first and second arbiters are to configure the first and second pairs of signal paths to be in one of a first, second, or third mode according to the mode control.

8. The apparatus of claim 7, wherein the PMU is to perform dynamic voltage and frequency scaling.

9. The apparatus of claim 7, wherein the first and second arbiters are to:
   connect each input of the first pair of signal paths to each input port or output port of the first or second arbiter; or
   short inputs of the first pair of signal paths to a same signal port of the first or second arbiter.

10. The apparatus of claim 7, wherein the first and second arbiters are to:
    open one electrical path of an input of one of the signal paths of the first pair of signal paths; or
    connect each input of the first pair of signal paths to each input port or output port of the first or second arbiter.

11. The apparatus of claim 7, wherein the first and second arbiters are to:
    connect each input of the second pair of signal paths to each input port or output port of the first or second arbiter; or
    short inputs of the second pair of signal paths to the same signal port of the first or second arbiter.

12. The apparatus of claim 7, wherein the first and second arbiters are to:
open one electrical path of an input of one of the signal paths of the second pair of signal paths; or
connect each input of the first pair of signal paths to each input port or output port of the first or second arbiter.

13. The apparatus of claim 7, wherein the first mode is a bandwidth mode, wherein the first and second arbiters are to cause propagation of separate signals on the first and second pairs of signal paths.

14. The apparatus of claim 7, wherein the second mode is a latency mode, wherein the first and second arbiters are to cause propagation of first same signals on the first pair of signal paths, and second same signals on the second pair of signal paths.

15. The apparatus of claim 7, wherein the third mode is an energy mode, wherein the first and second arbiters are to cause propagation of signals on alternate signal paths of the first and second pairs of signal paths.

16. A system comprising:
a memory;
a processor core coupled to the memory;
a power management unit (PMU) coupled to the processor core and to perform dynamic voltage and frequency scaling on the processor core;
a network-on-chip (NOC) comprising mesh or ring networks, wherein the NOC includes: a network of arbiters coupled to the PMU, wherein the network of arbiters include:
a first arbiter communicatively coupled to the PMU and to receive a mode control;
a second arbiter communicatively coupled to the PMU and to receive a mode control;
a first pair of signal paths having a first driver and a second driver coupled to the first arbiter, and a first receiver and a second receiver coupled to the second arbiter; and
a second pair of signal paths having a third driver and a fourth driver coupled to the second arbiter, and a third receiver and a fourth receiver coupled to the first arbiter, wherein the first and second arbiters are to configure the first and second pairs of signal paths to be in one of a first, second, or third mode according to the mode control; and
a wireless interface to allow the processor core to communicate with another device.

17. The system of claim 16, wherein the first mode is a bandwidth mode, wherein the first and second arbiters are to cause propagation of separate signals on the first and second pairs of signal paths.

18. The system of claim 16, wherein the second mode is a latency mode, wherein the first and second arbiters are to cause propagation of first same signals on the first pair of signal paths, and second same signals on the second pair of signal paths.

19. The system of claim 16, wherein the third mode is an energy mode, wherein the first and second arbiters are to cause propagation of signals on alternate signal paths of the first and second pairs of signal paths.

* * * * *

UNITED STATES PATENT AND TRADEMARK OFFICE
CERTIFICATE OF CORRECTION

PATENT NO. : 11,734,174 B2
APPLICATION NO. : 16/576687
DATED : August 22, 2023
INVENTOR(S) : Huichu Liu et al.

It is certified that error appears in the above-identified patent and that said Letters Patent is hereby corrected as shown below:

In the Claims

Column 19
Claim 1, Line 62 "interconnect, p1" should read -- interconnects, --

Column 20
Claim 5, Line 22 "moreinterconnects" should read -- more interconnects --
Claim 11, Line 66 "a same" should read -- the same --

Column 21
Claim 16, Line 29 "include" should read -- includes --

Column 22
Claim 16, Line 2 "receive a mode control" should read -- receive the mode control --
Claim 16, Lines 15-16 indent the last phrase "a wireless interface to allow the processor core to communicate with another device."

Signed and Sealed this
Thirteenth Day of August, 2024

Katherine Kelly Vidal
*Director of the United States Patent and Trademark Office*